Jan. 2, 1968          F. B. ENGLE          3,361,232
                      BRAKE ADJUSTER
Filed May 2, 1966                         2 Sheets-Sheet 1
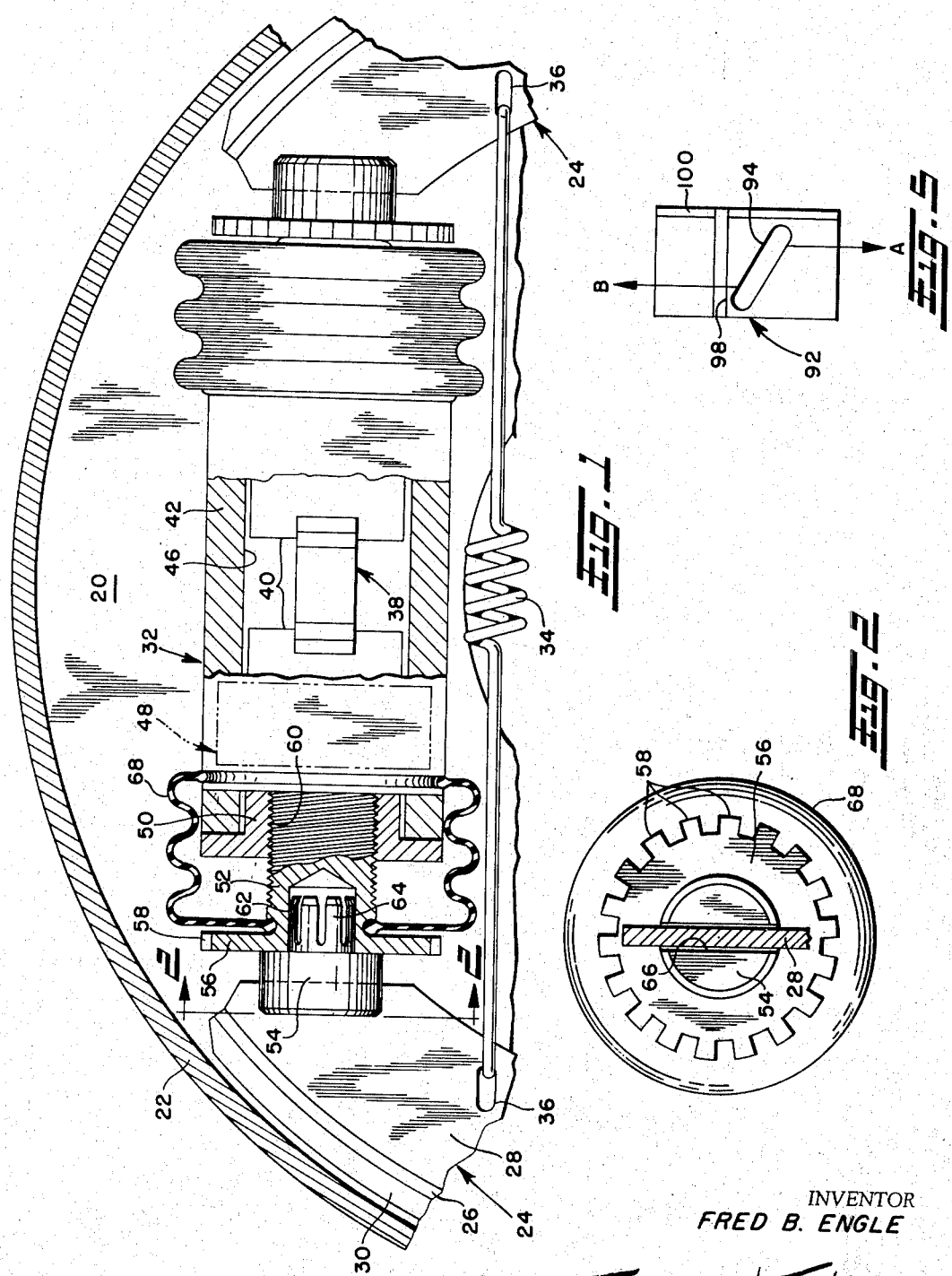
INVENTOR
FRED B. ENGLE
BY Teagno and Toddy
ATTORNEYS Jan. 2, 1968  F. B. ENGLE  3,361,232
BRAKE ADJUSTER
Filed May 2, 1966  2 Sheets-Sheet 2
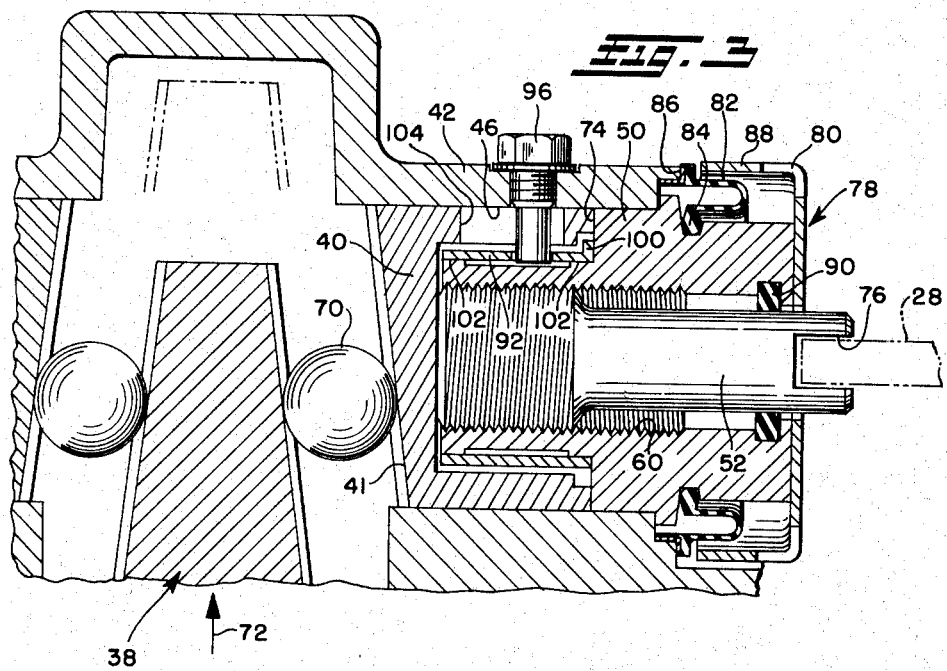
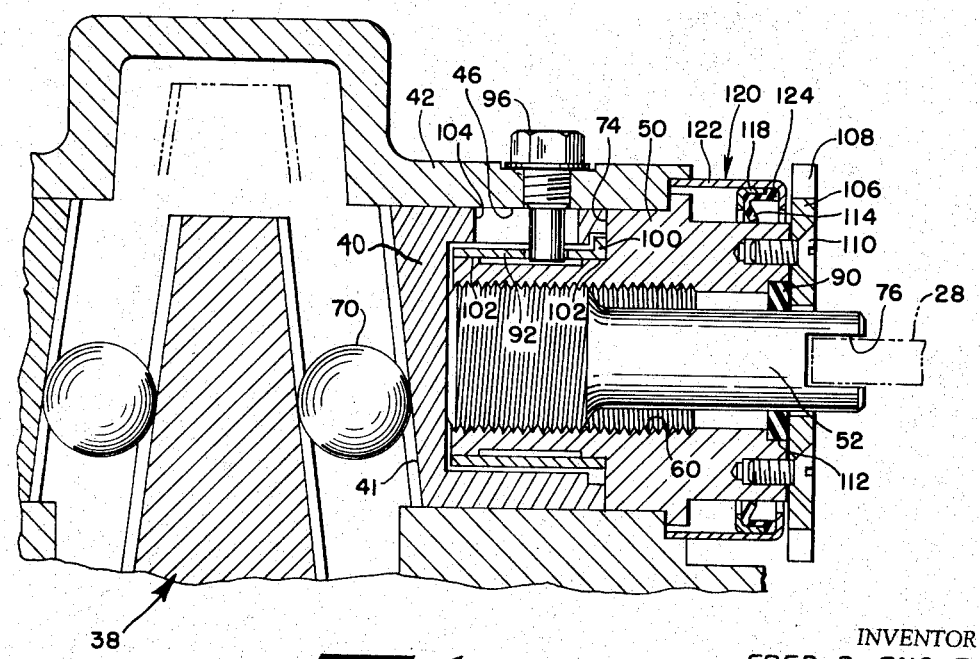
INVENTOR
FRED B. ENGLE
BY Teagno and Toddy
ATTORNEYS United States Patent Office 3,361,232
Patented Jan. 2, 1968

3,361,232
BRAKE ADJUSTER
Fred B. Engle, Marion, Ohio, assignor to Eaton Yale & Towne Inc., Cleveland, Ohio, a corporation of Ohio
Filed May 2, 1966, Ser. No. 546,842
6 Claims. (Cl. 188—196)

ABSTRACT OF THE DISCLOSURE

An automatic brake adjusting mechanism with means allowing manual adjustment of the brakes with conventional brake adjusting tools. The automatic adjuster comprises an adjusting sleeve which is rotated by a split clutch ring member having a cam slot for engagement by a fixed pin to expand and contract the clutch ring for lengthening a screw member threaded in the sleeve. The manual adjuster is a rotatable plate member connected externally to the adjuster sleeve.

---

This invention relates to brake adjusters that are applicable to brakes of the opposed expanding friction shoe type with the shoes operated in combination with an annular drum.

Still further, this invention relates to mechanisms for adjusting brakes on wheeled vehicles with the adjustment being effected automatically during actuation of the brakes.

Still further, this invention relates to mechanisms for manually adjusting the brakes on wheeled vehicles.

Still further, this invention relates to a brake adjuster embodying both manual and automatic features.

Still further, this invention relates to a mechanism for adjusting brakes on wheeled vehicles including vehicles operated in dusty and wet environments.

It is an object of this invention, therefore, to provide an improved manual brake adjusting mechanism that is of compact and simplified construction yet rugged and dependable.

It is a further object of this invention to provide an improved manual brake adjuster with an automatic brake adjuster the combination thereof providing an adjusting mechanism that is of compact and simplified construction.

A still further object of this invention is to provide a brake adjusting mechanism incorporating therein improved sealing allowing the brake adjuster to be used in vehicles operating in environments where salt, dirt, dust and water often contaminate brake adjusting mechanisms.

Other objects of this invention will appear in the following description and appended claims, reference being had to the accompanying drawings forming a part of this application wherein like reference characters designate corresponding parts in several views:

FIGURE 1 is a fragmentary front elevational view, partly in section, of a wedge-type brake, and with the operator thereof incorporating a manual adjusting means, automatic adjusting means and sealing means of the prior art;

FIGURE 2 is a sectional view taken along the line 2—2 of FIGURE 1;

FIGURE 3 is a sectional view showing the components making up the brake adjuster comprising the first embodiment of the invention;

FIGURE 4 is a sectional view showing the components making up the brake adjuster comprising the second embodiment of the invention;

FIGURE 5 is an elevational view of the clutch ring employed in both the first and second embodiments of the invention.

Before explaining the present invention in detail, it is to be understood that the invention is not limited in its application to the particular construction and arrangement of parts illustrated in the accompanying drawings, since the invention is capable of other embodiments and of being practiced and carried out in various ways. The invention may find application in the control of machine elements, wherein it may be desired to adjust the relative position of one element with respect to the other. Also, it is to be understood that the phraseology or terminology employed herein is for the purpose of description and not of limitation.

As shown in FIGURE 1, the environmental surroundings for the present invention comprise a brake mechanism as mounted within the confines of a brake drum carried by a vehicle wheel. It is to be understood that an axle carries a rotatable wheel hub and that the wheel is fastened to the hub. An annular brake drum surrounds the hub. The brake mechanism is fastened to a fixed backing plate carried by the axle.

More particularly, according to FIGURE 1, the environment shown typifies that of a heavy duty road vehicle, such as a truck. Associated with the wheel hub is a backing plate or spider element 20 that is non-rotatably carried by the axle.

A brake drum 22 is supported for rotation on the hub, not shown, and extends back over the backing plate 20. The brake drum 22 is oriented to extend transversely of the plane of the backing plate 20 and is an annular element as shown in section in FIGURE 1.

Located within the confines of the brake drum 22 are brake shoes 24, having tables 26 and webs 28.

Friction linings 30 are mounted as by riveting or bonding, not shown, on the tables 26 of shoes 24. The linings 30 are suitably fabricated of an asbestos compound or the like for appropriate resistance against heat that is generated during brake application by the linings being forced under substantial pressure against the inside of the drum 22 in stopping the vehicle.

A wedge type brake operator 32 is effective to operate the brake shoes. The operator 32 is mounted between opposed ends of the two brake shoes 24 by being secured in a suitable manner, as by bolting, not shown, to the backing plate 20. As the description proceeds, it will become apparent that the operator 32 is effective to spread the shoes 24 apart when the brakes are applied.

When the brakes are released, the shoes are retracted, along with the mechanism 32 by means of a return spring 34. The return spring 34 has its ends hooked into holes 36, formed in each of the webs 28 of shoes 24. Thus, upon release of brake application force imparted by the operator 32, the linings 30 are returned out of frictional contact with the drum 22.

Application of braking force is effected by a wedge 38, FIGURES 1, 3 and 4, that is adapted to be moved, in this instance, axially of the drum 22 by means of a fluid motor and linkage mechanism, not shown, to power the operator 32.

Prior art

A typical brake operator of the prior art is shown in FIGURE 1 to which reference is now made. Housing 42 has a smooth cylindrical bore 46. Wedge piston cups 40 are adapted to reciprocate in sliding contact within the bore 46. It is to be understood that the wedge 38 may include roller elements 70 (not shown in FIGURE 1) such as disclosed in FIGURE 3, which roller elements transmit force from the wedge element to the piston cups to thereby move the piston cups outwardly. The adjuster sleeve 50 is a tubular element having a threaded bore 60, within which a shoe-actuating screw or brake engaging screw 52 is threadedly carried. Forces are transmitted from the piston cup 40 to the adjuster sleeve 50 by means of engaging surfaces (not shown). At the left-hand end of the brake engaging screw 52 there is a coaxial stop bore 62. Into bore 62 there is fitted a brake shoe engaging stud 54. The right-hand end of the brake shoe engaging stud 54 is provided with a plurality of resilient fingers 64. The fingers 64 provide frictional resistance against relative rotation of brake engaging screw 52 and the brake shoe engaging stud 54.

The brake shoe engaging stud 54 has a head with a diametrically extending slot 66 therein, FIGURE 2. The slot 66 embraces the web 28 of a brake shoe 24. The stud 54 and brake engaging screw 52 are thus held against rotation because of their friction fit at 62 and because of the non-rotatable orientation of the web 28 of the brake shoe 24 in slot 66.

The prior art has provided alternate means of holding the brake shoe engaging stud and the brake engaging screw against relative rotation. Typical of alternate means is the provision of a radially serrated surface on both the brake shoe engaging stud and the head of the brake engaging screw. Interengaging radially serrated surfaces on the brake shoe engaging stud and brake engaging screw provide a non-rotatable relationship of the brake engaging screw and the brake shoe 24.

At the left-hand end of the brake engaging screw 52 there extends radially outwardly an annular disc head 56. The disc head 56 is provided about its periphery with teeth 58. The teeth 58 are adapted to receive an appropriate tool, not shown, for manual adjustment of the unit, as when the unit is initially manufactured and installed, the brakes are relined or other in-surface adjustment.

The frictional fit between brake shoe engaging stud 54 and brake engaging screw 52 permits manual adjustment by forced turning of the toothed head 56 by application of a tool. Otherwise, the stud 54 and screw 52 function as a non-rotatable unit.

It is to be understood that the prior art brake operator, as shown in FIGURE 1, may also include an automatic adjusting means. Automatic adjusters of the prior art may take many forms, and a phantom automatic brake adjuster 48 is shown in FIGURE 1.

To protect the various components of the brake operator, the prior art devices usually include a sealing or boot element 68 which boot element may be rotatably secured to the housing 42 and the brake engaging screw 52 by means of beads received in grooves in the respective elements.

*Operation of the prior art devices*

When the wedge 38 is moved transversely of the axis of the wedge piston cup 40, as shown in FIGURE 1, the piston cup 40 is moved axially to the left and the opposite piston cup to the right, to force the brake linings 30 into engagement with the drum 22.

When the brakes are released, as by outward movement of the wedge 38, the return spring 34 moves the entire mechanism back to the right as viewed in FIGURE 1. The automatic adjusted 48, FIGURE 1, may or may not make an adjustment to the length of the force transmitting linkage by rotating the adjuster sleeve 50 with respect to the brake engaging screw 52. At all times, however, the brake engaging screw 52 is maintained in non-rotatable relationship to the web 28 of the brake shoe 24 by means of the slotted brake shoe engaging stud 54 and the frictional engagement of said stud 54 with the brake engaging screw 52 at 62.

When it is desired to manually adjust the brakes by means of a suitable tool engaging the teeth 58 of the disc head 56 of the brake engaging screw 52, the frictional contact between the brake shoe engaging stud 54 and the brake engaging screw 52 at the resilient fingers 64 is broken to allow the brake engaging screw 52 to rotate with respect to the brake shoe web 28 and thereby accomplish a manual adjustment.

*Disadvantages of prior art devices*

From an examination of FIGURE 1, it may be seen that operation of prior art devices requires that the brake engaging screw be held in non-rotatable relationship to the web 28 of brake shoes 24. This non-rotatable relationship of the brake engaging screw and the web of the brake shoe is particularly critical if an automatic brake adjuster is incorporated in the brake operator. As an automatic adjuster operates on the principle of the adjuster sleeve 50 rotating with respect to a fixed brake engaging screw 52, quite obviously, automatic adjustment will be defeated if the brake engaging screw rotates in the same direction as the adjuster sleeve. Therefore, while the adjuster sleeve must be free to rotate with respect to the brake engaging screw, the brake engaging screw must be held in non-rotatable relationship with the web of the brake shoe. However, if a manual adjustment means is provided on the brake engaging screw, means must be provided in addition, to allow rotation of the brake engaging screw with respect to the web of the brake shoe. Therefore, resilient fingers 64 or other equivalent means must be provided between the brake shoe engaging stud and the brake engaging screw. As may happen, however, over a period of years in which the brakes are manually adjusted, the fingers 64 may lose some of their resiliency and thus, the friction fit between the brake shoe engaging stud 54 and the bore 62 of the brake engaging screw 52 is diminished. The automatic adjuster thereby loses some of its effectiveness as the brake engaging screw 52 is not held in non-rotating relationship with the web of the brake shoe as the adjuster sleeve 50 is rotated in automatic adjustment.

In addition, prior art embodiments incorporating therein one-piece boot structure between the adjuster screw and the housing often become contaminated with salt and water and other foreign material as extended operation of the brake results in tearing of the boot either through wear or through inadvertent piercing of the boot by the manual adjusting tool.

*The contribution*

One of the contributions made by this invention is the elimination of the brake shoe engaging stud and the friction joint between the brake shoe engaging stud and the brake engaging screw. This invention eliminates said stud by providing that manual adjustment of the brake is to be made by rotating the adjuster sleeve with respect to a fixed brake engaging screw. Another contribution of this invention is to provide sealing of the brake operator by means of individual sealing elements disposed between various of the components of the brake adjuster. The one-piece boot construction is eliminated.

This invention, in its broadest scope, provides for manually adjusting the brake operator by manually rotating the adjuster sleeve with respect to a fixed brake engaging screw. The brake shoe engaging stud of the prior art is completely eliminated as the web of the brake shoe directly engages the brake engaging screw in fixed non-rotating relationship.

It is to be understood that the manual adjusting and sealing means as taught by this invention may be utilized in a brake operator that may or may not incorporate therein means for automatic brake adjustment.

In a prior application of Robert C. Russell, United States application Serial No. 527,642, filed January 21, 1966, and assigned to Eaton Yale & Towne Inc., there is disclosed a unique automatic brake adjusting mechanism. This invention improves upon the Russell automatic adjusting mechanism by incorporating therein an improved manual adjusting feature as well as improved sealing.

First embodiment—FIGURE 3

In FIGURE 3, there is shown a cross-section of one-half of a brake operator incorporating therein a first embodiment of the instant invention. Where possible, elements common to both FIGURES 1 and 3 have been given similar identification numbers. Thus, in FIGURE 3, there is shown a housing 42 having a smooth cylindrical bore 46 therein. A wedge piston cup 40 is adapted to reciprocate in sliding contact within the bore 46. The wedge piston cup 40 includes an annular sidewall that is slightly smaller in diameter than the diameter of bore 46 to provide a precision sliding fit. The wedge piston cup 40 also includes an end wall that has an exposed inclined surface 41. A roller 70 operates along the inclined surface 41 and is embraced between such surface and the wedge 38. The structure described is exemplary of a roller carrier, and modifications within the scope of the invention can be tolerated at this point.

It is to be understood that movement of the wedge 38 in the arrow direction 72, FIGURE 3, will be effective to move the wedge piston cup 40 to the right within the bore 46 of housing 42.

The adjuster sleeve 50 is a tubular element having a threaded bore 60 within which a brake engaging screw 52 is threadedly carried. Provided on the adjuster sleeve 50 is a shoulder 74 defining abutment means for the piston cup 40. Shoulder 74 is designed to provide a thrust absorbing abutment surface for axial force transmission from the piston cup 40 to the adjuster sleeve 50. At the right-hand end of the brake engaging screw 52 of FIGURE 3, there is provided a slot 76 to receive a portion of web 28 of brake shoe 24.

Manual adjustment means are provided on the exterior of the adjuster sleeve 50. An adjuster plate 78 is secured to the adjuster sleeve by spot welding or other suitable means. The adjuster plate 78 is generally L-shaped and at the junction of the legs of the plate, cut out portions 80 are provided defining teeth that may be engaged by a suitable tool to rotate the adjuster sleeve. It is to be understood that the teeth 80 may be provided on the surface of the adjuster sleeve itself. However, for ease of manufacture, a separate adjuster plate 78 is disclosed herein as a preferred embodiment.

The L-shaped adjuster plate 78 provides an added advantage of acting as a protective housing member for part of the seal structure. Sealing between the adjuster sleeve 50 and the housing 42 is provided by means of seal 82. Bead 84 on seal 82 is received in a groove of the adjuster sleeve. The upper end of seal 82 is bonded or otherwise secured to a rigid ring which ring 86 is retained in press-fitted relationship with the housing 42. The seal 82 is therefore held in fixed non-rotating relationship with respect to the housing 42. Bead 84 permits a sliding relationship between the seal and the adjuster sleeve as said adjuster sleeve is rotated with respect to the housing 42. The seal 82 may be fabricated of any suitable flexible material such as rubber. Leg element 88 of the adjuster plate 78 provides protection for the seal in that the major portion of the flexible part of the seal is not exposed. Sealing between the brake engaging screw 52 and the adjuster sleeve 50 is provided by means of seal 90. Seal 90 is received in a recess in the bore of the adjuster sleeve and may be fabricated of any suitable sealing material such as rubber.

Around the left-hand portion of the adjuster sleeve 50 there is provided a novel clutch element providing automatic compensation for brake lining wear. This novel clutch mechanism is described and claimed in the application of Robert C. Russell, Ser. No. 527,642, filed Jan. 21, 1966, and assigned to Eaton Yale & Towne Inc. A more complete description of this novel adjusting mechanism may be found in the Russell application. Briefly described, the automatic adjuster incorporates a clutch ring 92 carried by cylindrical shoulders 102 of the adjuster sleeve 50. The clutch ring 92 is a unitary but split cylindrical member as more clearly shown in FIGURE 5. Near a longitudinal edge 98 thereof, the split ring is provided with a cam slot 94 angularly disposed to the axis of the ring. A flange 100 is provided on one end of the clutch ring in order that the assembler of the brake mechanism will not put the ring in backwards and thereby orient the cam slot 94 in a direction opposite to that required for proper operation of the mechanism.

A pin member 96 is received in a threaded bore in the housing 42 and includes a tip that extends through the axially disposed slot 104 in the piston cup 40 and the angularly disposed slot 94 in the clutch ring 92.

As is more fully described in the Russell application, the clutch ring 92 is resilient and functions to expand and contract depending whether forces are tending to wrap or unwrap the ring about the adjuster sleeve 50. With reference to FIGURE 5, if a force B is applied to a longitudinal edge 98 of the clutch ring in a clockwise direction (as viewed from the right-hand edge of ring 92, FIGURE 5) this force will tend to wrap or contract the ring about the adjuster sleeve. Similarly, if a force A is applied at the longitudinal edge 98 in a counterclockwise direction, this force will tend to unwrap or expand the ring causing it to slip relative to the adjuster sleeve.

Considering now the operation of the clutch as shown in FIGURE 3, it will be noted that movement of the wedge 38 upwardly is effective to displace the piston cup 40 to the right. The adjuster sleeve 50 and brake engaging screw 52 are consequently moved to the right forcing the brake linings into contact with the brake drum.

The operation of the automatic adjuster of FIGURE 3 will now be described although reference is made to the Russell application for a more complete disclosure thereof. As the clutch ring 92, carried on shoulders 102 of the adjuster sleeve 50 moves from left to right in FIGURE 3, during the brake application, the cam slot 94 of the clutch ring 92 is caused to slip past the pin 96 thereby imparting a counterclockwise directed rotational force A, FIGURE 5, to the clutch ring. As previously mentioned, a counterclockwise oriented rotational force expands the clutch ring causing it to slide relative to the adjuster sleeve 50.

Of course, the axial slot 104 in the piston cup 40 does not act on the pin during axial movement of the piston cup since it serves only to guide the cup 40 and prevent it from rotating.

Thus, in the brake application portion of the braking cycle, as the piston cup and adjuster mechanism are moved to the right as viewed in FIGURE 3, the clutch ring slips on shoulders 102.

When the brakes are released as by downward movement of wedge 38 in FIGURE 3, and operation of the return spring 34 (FIGURE 1), the piston cup 40, adjuster sleeve 50, and brake engaging screw 52 move toward the left as viewed in FIGURE 3. The tip of pin 96 disposed within the cam slot 94 of the clutch ring 92 imparts a clockwise oriented rotational force B, FIGURE 5, to the clutch ring. However, clockwise application of a rotational force to the clutch ring causes the clutch ring to contract and lock with respect to the adjuster sleeve. This will then cause the cam slot 94 to follow the tip of pin 96 and cause rotation of the adjuster sleeve perhaps a tenth of a turn. This will cause the brake engaging screw 52 to be displaced perhaps a half thousandth of an inch to the right out of the threaded bore 60 of the adjuster sleeve 50. Brake lining wear is thus compensated for in this instant of retracting movement when the brakes are released.

It is to be understood that the automatic compensation described above does not necessarily take place on every inward stroke of brake application because, obviously, brakes do not wear that fast. It only takes place when axial movement of the piston cup is sufficient, because of brake lining wear, to cause the tip of pin 96 to contact the walls of the slot 94 in the clutch ring 92 and thereby induce the clutch ring to wrap around the adjuster sleeve and become fixed thereto. Without brake lining wear, the slot 94 may move axially a slight distance without adjustment taking place. This is because the diameter of the tip of pin 96 is necessarily less than the axial width of the cam slot 94. This difference between the dimension of the tip of the pin 96 and the axial width of the cam slot 94 may be regulated to thereby impart any amount of "slack" into the system. During excessive braking thermal expansion of the brake drum results with the possibility of overcompensation of the brake adjuster. The "slack" in the adjuster must exceed the estimated thermal expansion of the brake drum.

It should be noted that the brake adjuster mechanism of FIGURE 3 is yielding or reversible should severe overload forces be encountered in certain braking applications. We will now consider the action of the brake adjuster in a situation of reverse braking. When brakes are applied to a forward moving vehicle and the vehicle is subsequently brought to a stop, the vehicle may rock back before the brakes are released. This situation is critical particularly if the vehicle has been climbing a hill and the brakes have been applied before the vehicle has reached the top of the hill. A rocking back of the vehicle causes the brake drum, which is in contact with the brake linings, to rotate said linings in a clockwise direction about the vehicle axle. Considering FIGURE 1, a clockwise rotation of drum 22 with brake linings 30 engaged therewith will force the left brake shoe 24 into contact with stud 54 and brake engaging screw 52 imparting a great compressive force to the left side of the adjuster mechanism. This compressive force, which may be on the order of fifteen thousand pounds, is transmitted from the brake engaging screw 52 to the adjuster sleeve 50 and piston cup 40 tending thereby to force the brake engaging screw, adjuster sleeve and piston cup into the housing 42. As previously shown, a movement of the adjuster mechanism into the housing 42 (as when the brakes are released) results in an elongation of the force transmitting linkage due to the fact that the clutch ring 92, FIGURE 3, is wrapped about shoulders 102 of the adjuster sleeve 50. However, due to the magnitude of this rocking back compressive force exerted on the adjuster mechanism and the resulting increased friction forces at the threaded interface of the brake engaging screw 52 and adjuster sleeve 50, the adjuster sleeve 50 is unable to rotate with respect to the brake engaging screw 52. Something therefore must give, and if no provision is made for yielding of the clutch ring 92, the tip of pin 96 will be sheared off or the slot 94 in the clutch ring 92 will be deformed. In order to provide that the clutch ring 92 yields in situations where high overload forces are encountered during a brake adjustment period, the clutch ring is seated on cylindrical shoulders 102 of the adjuster sleeve 50 such that the clutch ring will slip on said shoulders 102 when very high clockwise oriented forces B, FIGURE 5, are imparted to the clutch ring.

The action of the clutch mechanism may be summarized thusly: when the brakes are applied, the adjuster mechanism is carried to the right as viewed in FIGURE 3. Interaction of pin 96 and the slot 94 of the clutch ring 92 unwinds the clutch ring allowing it to slip on the adjuster sleeve 50 permitting the adjuster mechanism to move to the right without rotation of the adjuster sleeve 50 with respect to the brake engaging screw 52. The frictional interface at shoulder 74 tends to promote clutch ring unwinding rather than rotation during this brake application period. When the brakes are released, the return spring operates to force the adjuster mechanism to the left as viewed in FIGURE 3. In such a movement to the left, the pin 96 coacts with the cam slot 94 in the clutch ring 92 to cause the clutch ring to wrap about the shoulders 102 of the adjuster sleeve 50 and become fixed thereto. The clutch ring may be positioned in an interference fit on the shoulders 102 of the adjuster sleeve to promote wrapping of the clutch ring about the shoulders 102 during brake release. At this point, in order to continue proceeding to the left, the adjuster sleeve 50 must rotate to accommodate the slot 94 in the clutch ring and the pin 96. The rotation of the adjuster sleeve with respect to the brake engaging screw results in an incremental elongation of the adjusting mechanism thereby compensating for brake lining wear. Should tremendous overload forces be encountered such that the adjuster sleeve is not able to rotate with respect to the brake engaging screw due to the high friction forces present at the interface of threads 60 of the adjuster sleeve and the corresponding threads of the brake engaging screw, the clutch ring will slip on the adjuster sleeve shoulders 102 allowing the adjuster mechanism to proceed to the left (into the housing 42) without adjustment.

The clutch mechanism therefore is yielding or reversible. A counterclockwise oriented force A, FIGURE 5, imparted to the walls defining the cam slot 94 tends to unwind the clutch ring and cause it to slip on the shoulders of the adjuster sleeve 50. A clockwise oriented force B, FIGURE 5, imparted to the walls defining the cam slot 94 tends to cause the clutch ring to wrap about the shoulders 102 of the adjuster sleeve and become fixed thereto. However, if the magnitude of the force B is increased, a point will be reached wherein the clutch ring will slip on the shoulders 102. Thus, unlike brake adjusters employing ratchet teeth, the adjuster of the instant application is reversible. Because the adjuster is reversible, it is possible to provide a manual adjusting means at the adjuster sleeve rather than at the brake engaging screw. Note FIGURE 3. Slot 76 in the brake engaging screw 52 receives web 28 of brake shoe 24. The brake engaging screw is thus non-rotatably fixed to the brake shoe at all times. The necessity for utilizing a stud as shown at 54 in FIGURE 1 and a separate releasable joint between the stud and the brake engaging screw, as shown at 62, 64 in FIGURE 1, is thus eliminated. A peripheral tooth surface is provided on the adjuster sleeve. In FIGURE 3, the tooth surface is defined by recesses 80 in the L-shaped adjuster plate 78. Note that upon application of a suitable adjusting tool, the adjuster sleeve may be rotated either in a clockwise or counterclockwise direction due to the fact that the clutch mechanism is yielding. In one direction of rotation, the clutch ring will simply slip on the shoulders 102 of adjuster sleeve 50 permitting manual adjustment. In the opposite direction of rotation, the clutch ring will initially tend to wrap about the shoulders 102 and become fixed thereto. However, sufficient force may be imparted by the operator making the manual adjustment to cause the clutch ring 92 to slip on the shoulders 102 of the adjuster sleeve 50. Manual rotation of the adjuster sleeve with respect to the brake engaging screw may thus be achieved in either direction.

As previously pointed out, the peripheral toothed surface on the adjuster sleeve may take many forms. The teeth may be formed integral with the adjuster sleeve or, as shown in FIGURE 3, may take the form of a separate adjuster plate suitably secured or fastened to the adjuster sleeve. In the embodiment of FIGURE 3, an L-shaped adjuster plate is utilized such that the leg 88 of the adjuster plate can form a protective housing for the seal 82.

In FIGURE 4, there is shown a second modification of the manual adjusting means. The principle of actuation of the brake is basically the same as that of FIGURE 3 and includes an identical automatic brake adjuster. As in FIGURE 3, there is shown in FIGURE 4 a housing 42 having a longitudinal bore 46 therein. Piston cup 40 is received in sliding relationship in the longitudinal bore and includes an inclined surface 41. Wedge 38, through the medium of roller element 70, imparts an axial force to the piston cup 40 tending to displace said piston cup from left to right of FIGURE 4 during the brake application. As in FIGURE 3, a brake engaging screw with slot 76 to receive web 28 of the brake shoe 24 is provided. External threads of brake engaging screw 52 mate with complementary internal threads 60 of the adjuster sleeve 50. A clutch ring 92 is carried by shoulders 102 of the adjuster sleeve 50. Said clutch ring includes the same cam slot 94 and flange 100 as provided in the clutch ring of FIGURE 3 (as more clearly shown in FIGURE 5). Pin 96 is received in a threaded bore of the housing 42. The seal structure and adjuster plate structure of FIGURE 4 differ from that shown in FIGURE 3. Thus, the adjuster plate of FIGURE 4 comprises a flat circular member 106 having teeth 108 thereon. It is understood that the circular adjuster plate 106 and the teeth 108 resemble somewhat the disc head 56 and teeth 58 of FIGURE 2. Adjuster plate 106 is suitably secured to the adjuster sleeve 50 by means of fasteners 110. As in FIGURE 3, various means may be employed to attach the adjuster plate to the adjuster sleeve including fasteners, spot welding, tongue and groove joints, etc. A counterbore 112 is provided in the right-hand end of the adjuster sleeve 50. Said counterbore receives a seal 90 which seal is retained in assembled relation to the brake engaging screw by means of the adjuster plate 106. Sealing between the adjuster sleeve 50 and the housing 42 is accomplished by means of sealing element 120. Said sealing element 120 comprises an outer rigid housing 122 which is press-fitted into a counterbore in the end of bore 46. This housing by its L-shaped design both locates and protects a standard conventional lip seal assembly 124 which consists of its own inner rigid housing 118. Said housing 118 press-fits and bottoms into outer housing 122. Bonded to said housing 118 is an elastomeric portion 114 which in the form of a lip seals against an unthreaded shank portion of the adjuster sleeve 50. In all respects, the operation of the adjuster shown in FIGURE 4 is identical to the operation of the adjuster shown in FIGURE 3. The differences in the figures reside in the sealing elements used as well as the particular configuration of the adjuster plate utilized.

Advantages of the invention

A simplified and improved brake adjuster has been provided. The parts are of simple construction and easily fabricated. The mechanism is dependable and durable.

All parts are sealed in a compact structure for protection against either loss of lubricant or entry of foreign materials.

The sealing boot of the prior art structures has been replaced by a two piece sealing structure that is enclosed by a protective housing.

The brake shoe engaging stud of the prior art devices has been eliminated. The brake engaging screw is of one piece construction directly engaging the web of the brake shoe. Brake adjustment, either automatic or manual, is achieved entirely through rotation of the adjuster sleeve. The automatic brake adjuster clutch mechanism is reversible, making it possible to manually adjust the brakes by either clockwise or counterclockwise rotation of the adjuster sleeve.

Extended scope of invention

The invention has been shown in a wedge operator. However, it is believed that it will be understood to those skilled in the art that it is logically applicable to hydraulic brakes.

More generally, the invention may be characterized as a force-applying mechanism wherein automatic compensation is provided to account for wear as between working surfaces operatively associated within the mechanism and wherein actuating force is applied through a reliable member suitably supported on a frame or housing for the same.

What is claimed is:

1. In a brake adjuster for brakes having linings that are subject to wear during use;
   a housing,
   an elongated bore in said housing,
   piston means reciprocable within said bore, means for applying axial force to said piston means to produce reciprocable movement thereof within said bore,
   an adjuster sleeve positioned within said housing and rotatable relative to said housing,
   thrust absorbing abutment means between said piston means and said adjuster sleeve,
   an axially oriented, threaded bore within said adjuster sleeve,
   a brake engaging screw carried within said threaded bore of said adjuster sleeve, said brake engaging screw engaging the web of a brake shoe in fixed non-rotating relationship,
   manual adjustment means including a toothed surface on a plate member which plate member is secured to an external surface of said adjuster sleeve, sealing means between said brake engaging screw and said adjuster sleeve, and said adjuster sleeve and said housing,
   said plate member being generally L-shaped with one leg thereof secured to said adjuster sleeve and the other leg thereof overlying said sealing means between said adjuster sleeve and said housing.

2. In an automatic brake adjuster for brakes having linings that are subject to wear during use,
   a housing,
   an elongated bore in said housing,
   piston means reciprocable within said bore,
   means for applying axial force to said piston means to produce reciprocable movement thereof within said bore,
   an adjuster sleeve positioned within said housing and rotatable relative to said housing,
   thrust absorbing abutment means between said piston means and said adjuster sleeve,
   an axially oriented, threaded bore within said adjuster sleeve,
   a brake engaging screw carried within said threaded bore of said adjuster sleeve and movable axially of said adjuster sleeve upon relative rotation between said sleeve and said screw,
   means restraining said screw against rotation,
   automatic adjustment means including clutch means operably associated with said housing, said clutch means being characterized by a longitudinally split clutch ring carried by said adjuster sleeve,
   said clutch ring having a cam slot on the exterior surface thereof, and a radial pin member depending from the wall defining the housing bore, said pin having a tip disposed in said cam slot whereby said clutch ring is adapted to expand and slide on said adjuster sleeve on application of force against the walls defining said cam slot in one direction of rotation, and contract and lock to said adjuster sleeve on application of force against the walls defining said cam slot in the opposite direction of rotation, and
   manual adjustment means on said adjuster sleeve whereby said adjuster sleeve may be manually rotated to thereby provide axial movement of said adjuster sleeve with respect to said brake engaging screw.

3. The invention of claim 2 in which said split clutch ring is cylindrical and is carried by at least one cylindrical portion of the adjuster sleeve.

4. The invention of claim 3 in which said clutch ring is defined by a longitudinally split hollow cylindrical member carried by at least one cylindrical surface of the adjuster sleeve.

5. The invention of claim 4 in which the clutch ring and cylindrical surface of the adjuster sleeve are in an interference fit relationship whereby upon application of a force in a first direction against the walls defining said cam slot said clutch ring will contract and lock to said adjuster sleeve.

6. The invention of claim 2 in which the cam slot is disposed in an angle to the axis of the housing bore and the cam slot width exceeds the diameter of the pin disposed therein thereby permitting a limited axial movement of the clutch ring with respect to the pin.

References Cited
UNITED STATES PATENTS

| | | | |
|---|---|---|---|
| 2,345,108 | 3/1944 | Goepfrich | 188—79.5 |
| 3,068,964 | 12/1962 | Williams et al. | 188—79.5 |
| 3,279,565 | 10/1966 | Cusack | 188—79.5 |

DUANE A. REGER, *Primary Examiner.*